(12) United States Patent
Ono

(10) Patent No.: US 7,530,718 B2
(45) Date of Patent: May 12, 2009

(54) LAMP FOR VEHICLE

(75) Inventor: Shigeki Ono, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 32 days.

(21) Appl. No.: 11/724,745

(22) Filed: Mar. 16, 2007

(65) Prior Publication Data

US 2007/0230203 A1    Oct. 4, 2007

(30) Foreign Application Priority Data

Mar. 29, 2006  (JP)  ............................. P2006-091866

(51) Int. Cl.
- *F21V 11/00* (2006.01)
- *F21V 7/00* (2006.01)
- *B32B 27/00* (2006.01)
- *B05D 5/12* (2006.01)

(52) U.S. Cl. ........................ 362/509; 362/311; 427/125; 428/450

(58) Field of Classification Search ................. 362/311, 362/351, 509–511; 428/429, 447, 450, 451; 427/125

See application file for complete search history.

(56) References Cited

U.S. PATENT DOCUMENTS

| 6,488,394 B1 * | 12/2002 | Mabe et al. | .................. 362/510 |
| 6,541,537 B1 * | 4/2003 | Catena | ........................ 522/150 |

FOREIGN PATENT DOCUMENTS

JP    2000-106017    4/2000

* cited by examiner

*Primary Examiner*—John A Ward
(74) *Attorney, Agent, or Firm*—Fish & Richardson P.C.

(57) ABSTRACT

A vehicle lamp includes a reflective member having a silver vapor deposition reflective surface with good durability to prevent cracking or peeling of a protective film and capable of maintaining a high reflectance. The reflective member includes a topcoat layer which serves as a protective film on a silver vapor deposition film which is a silver alloy including Nd on a surface of a base material made of synthetic resin inside a lamp chamber S. The topcoat layer 64 includes a transparent modified silicone series resin using a silicone resin and an acrylic resin as resin components.

4 Claims, 11 Drawing Sheets

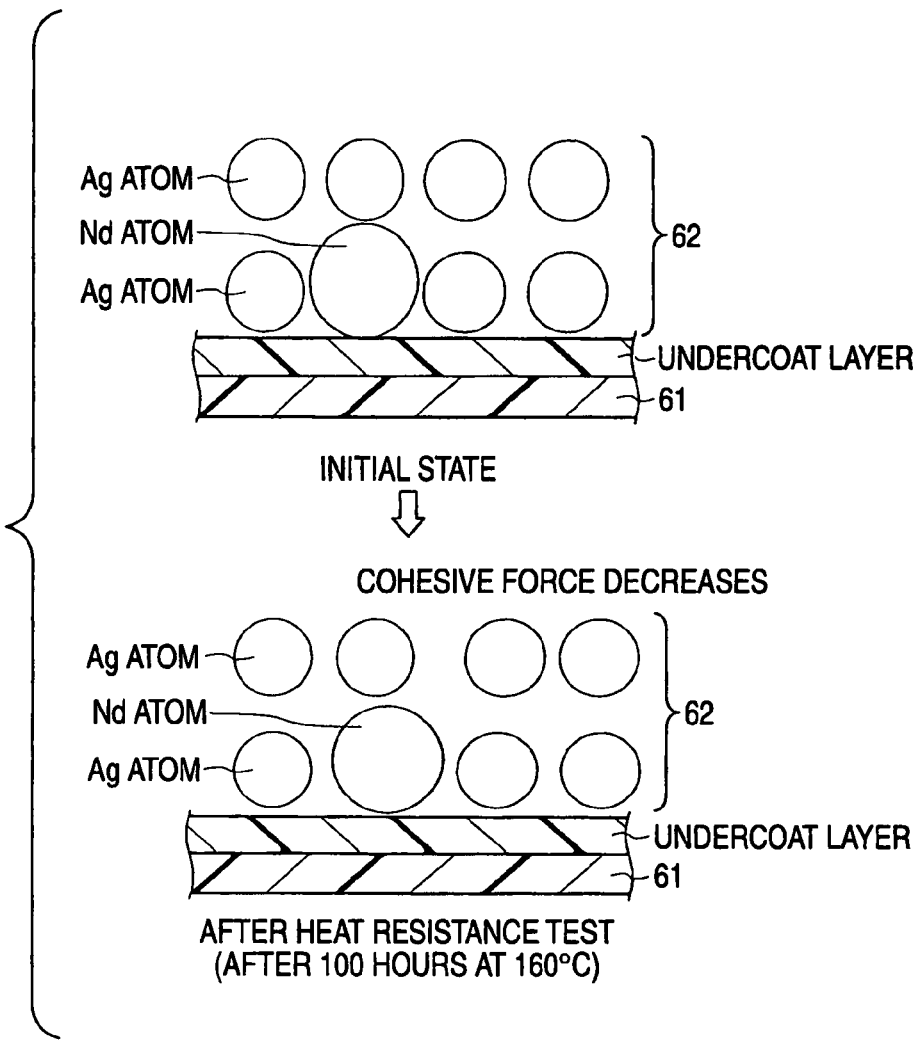

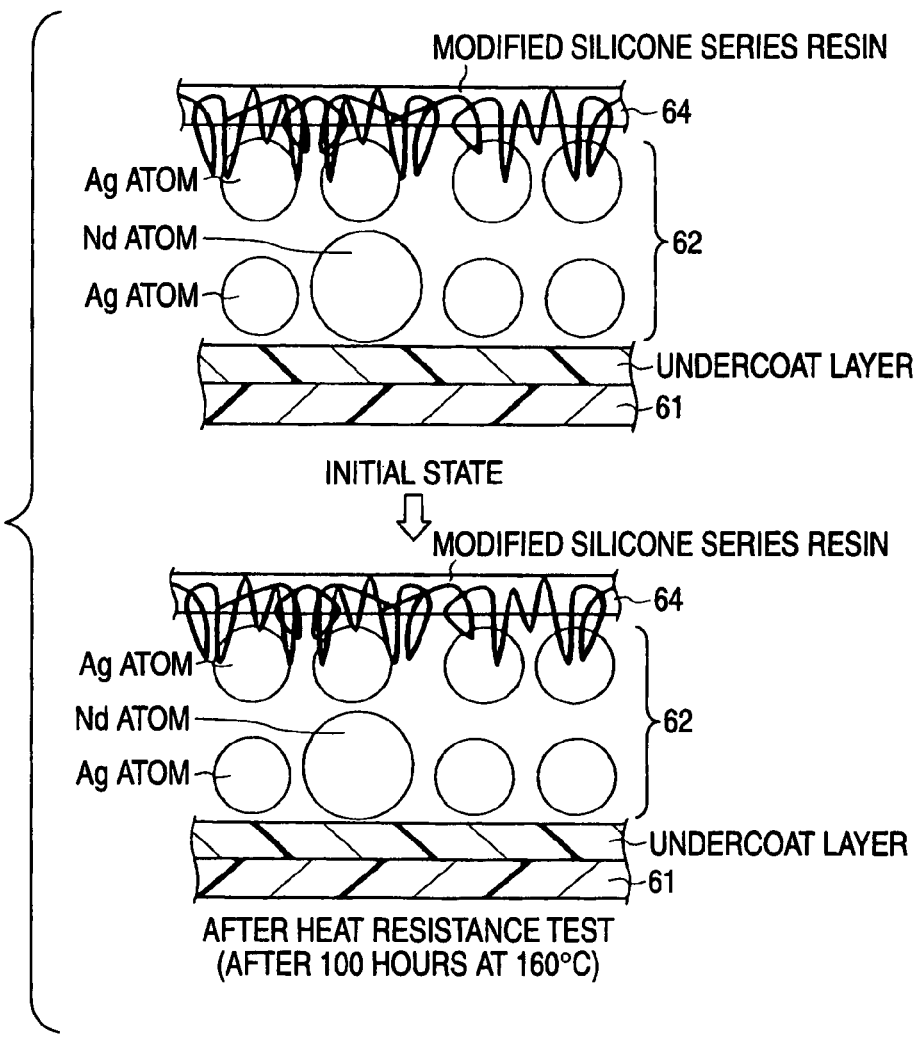

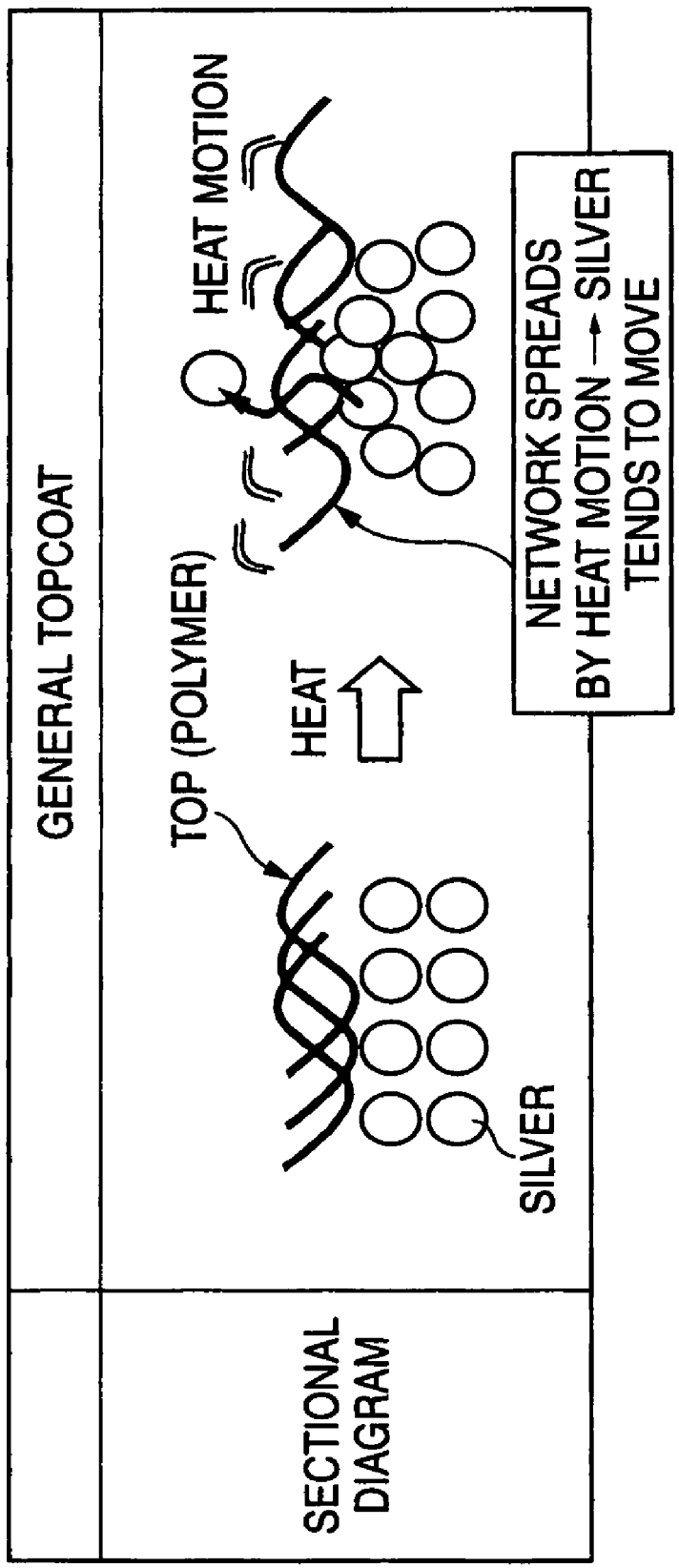

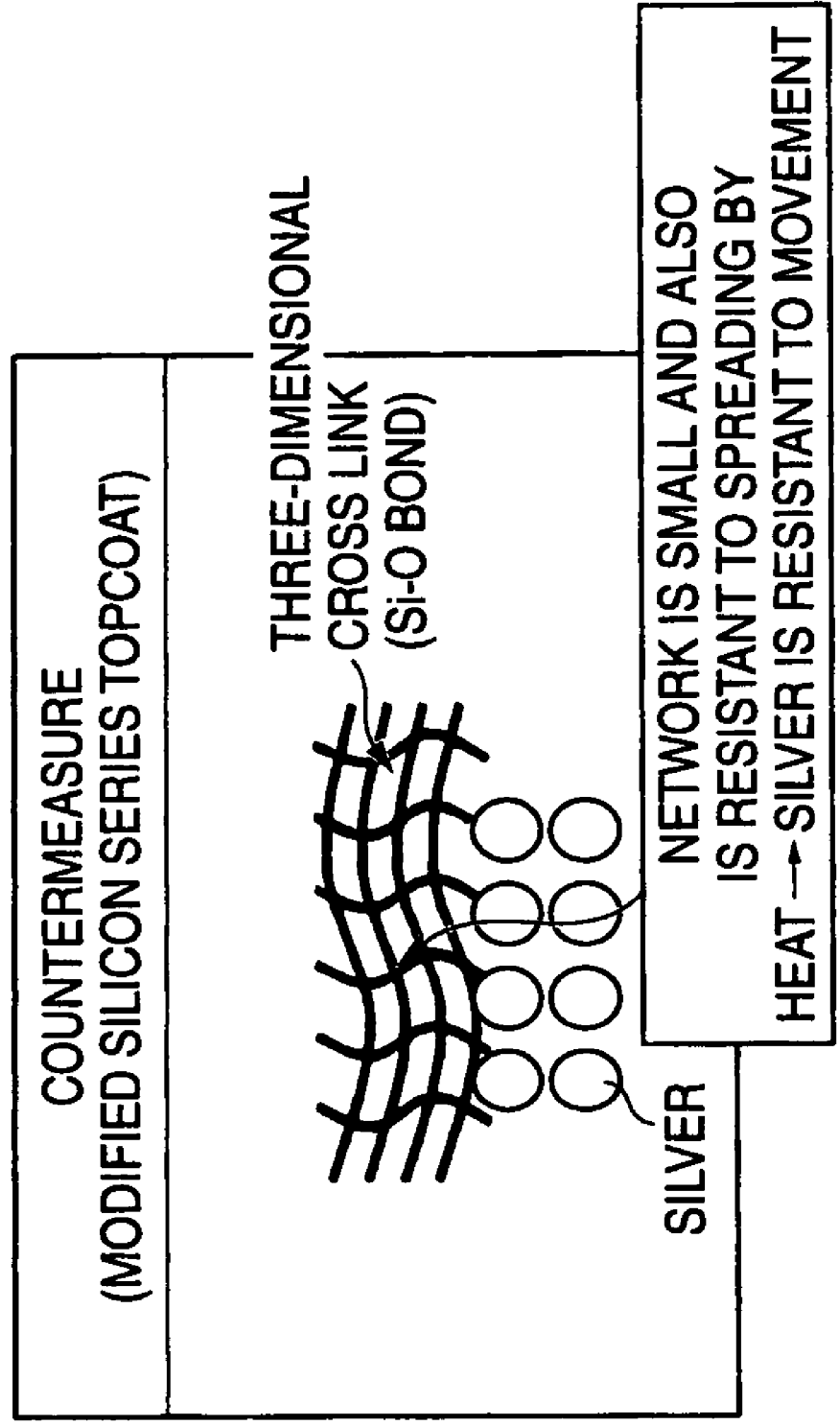

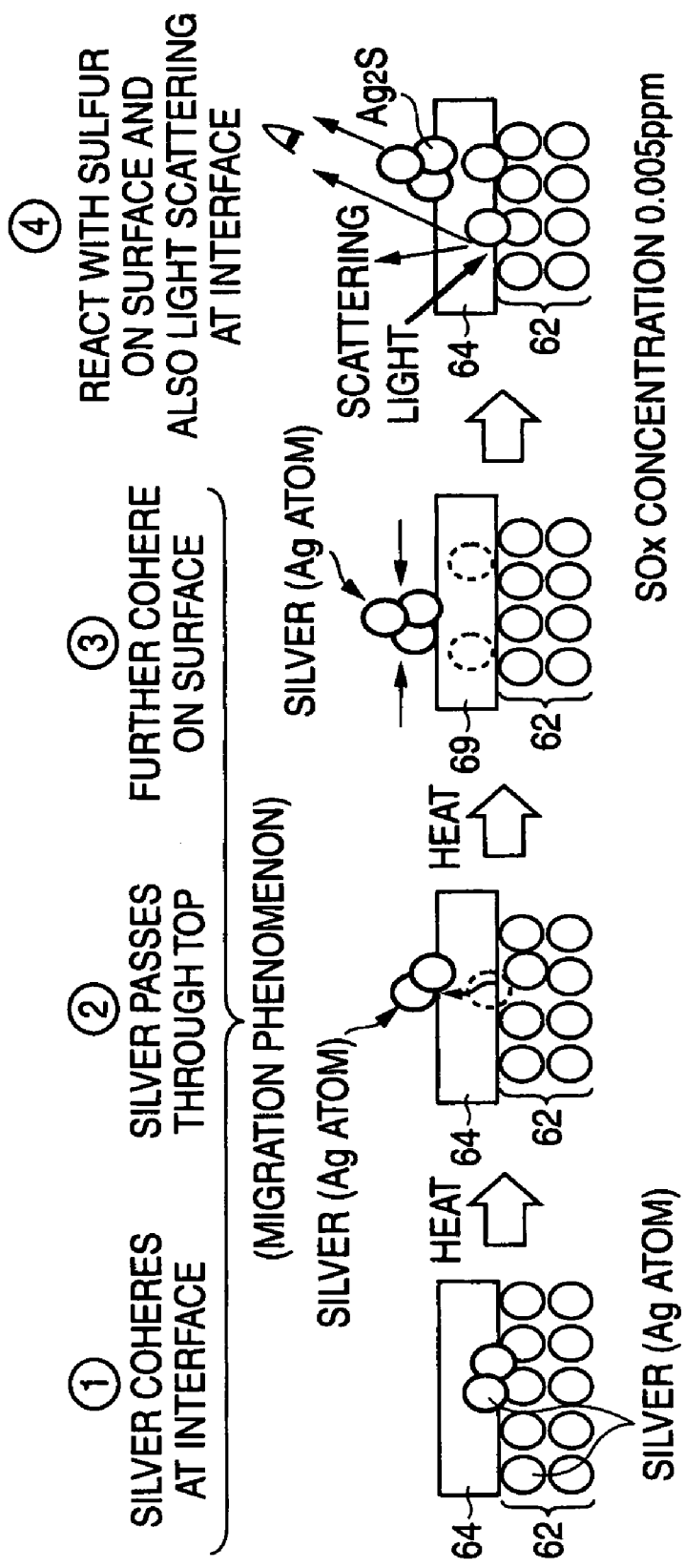

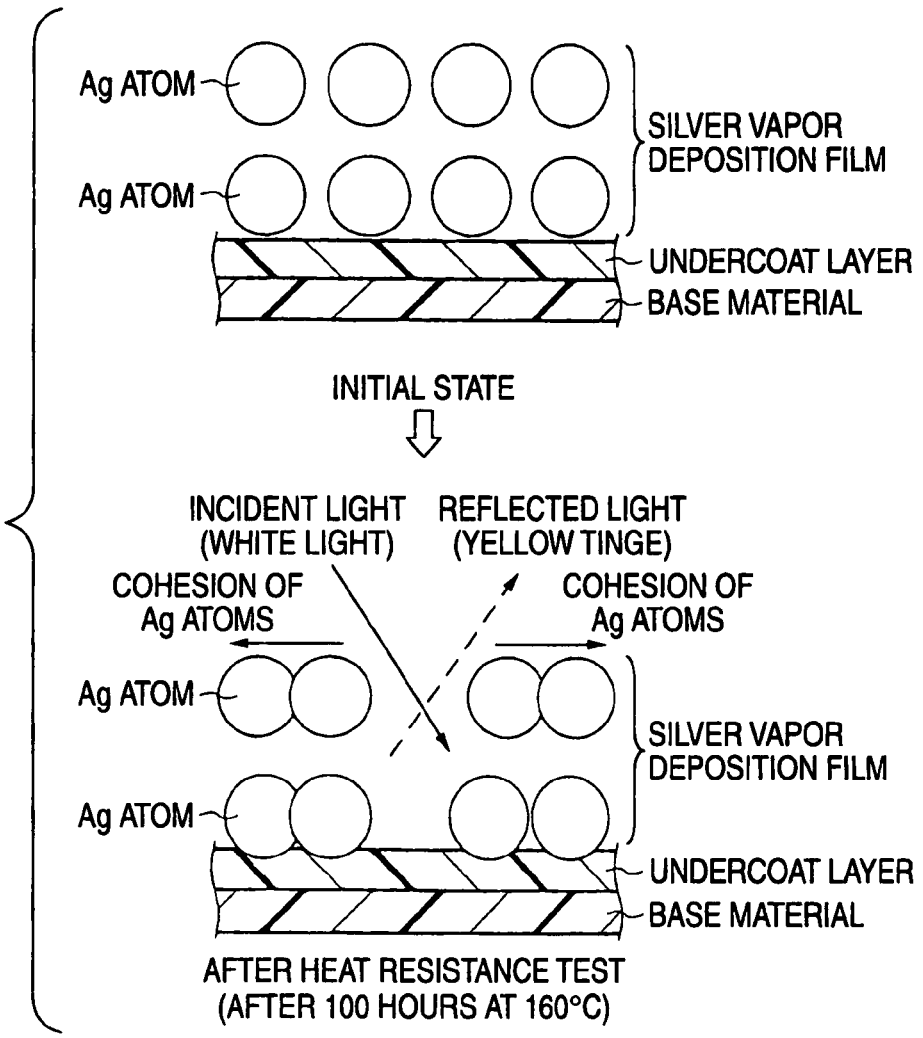

LAMP FOR VEHICLE

TECHNICAL FIELD

The present disclosure relates to a lamp for a vehicle including a reflective member inside a lamp chamber, and particularly to a lamp for a vehicle including a reflective member in which a topcoat layer that serves as a protective film is formed on a silver vapor deposition film on a surface of a base material made of synthetic resin inside a lamp chamber.

BACKGROUND

A reflective member can be used as a reflector in a vehicle head lamp requiring high luminous intensity or an extension reflector which is a decorative member arranged inside a lamp chamber so as to surround a reflector. Such a reflective member can have aluminum vapor deposition treatment performed on a surface of a base material made of synthetic resin. In the aluminum vapor deposition reflective surface, a constant, high, regular reflectance of about 90% is obtained in all the wavelength ranges, so that the reflective member is widely used in other vehicle lamps in addition to the head lamp.

However, in the aluminum vapor deposition reflective surface, there is still a loss of about 10% in the regular reflectance. Therefore, more improvement in the regular reflectance is desirable.

After a silver vapor deposition film having a high regular reflectance (99%) was developed as a reflective surface for an indoor lighting apparatus, application to a reflective surface of a reflective member of a lamp was examined. However, the silver vapor deposition film reacts by making contact with sulfur dioxide (e.g., present in sweat, exhaust gas), oxygen (hot oxygen) and moisture in the atmosphere (silver oxide or silver sulfide is generated), and the silver vapor deposition film is easily discolored (e.g., yellowed) or corroded, and the decrease in the regular reflectance can be significant.

Hence, it has been proposed to provide a topcoat layer 3 or an undercoat layer 4 of a modified silicon resin with good gas barrier properties at high temperature. The topcoat or undercoat layer is laminated and formed of a silver vapor deposition film 2 on a surface of a base material 1 made of synthetic resin. The topcoat layer 3 or the undercoat layer 4 functions as a gas barrier to sulfur dioxide (sweat, exhaust gas), oxygen and moisture in the atmosphere. Corrosion or discoloration of the silver vapor deposition film 2 is inhibited, and a high, regular reflectance is maintained. (See Japanese Patent Document JP-A-2000-106017 and see FIG. 10).

However, as disclosed by JP-A-2000-106017, using gas barrier properties of the topcoat layer or the undercoat layer (hereinafter called "coat layers") formed of the modified silicon resin, there was some effect in the case of inhibiting discoloration (yellowing) of a silver vapor deposition reflective surface (silver vapor deposition film), but there were problems in which discoloration or corrosion occurs, and the regular reflectance decreases after a long time (e.g., after a heat resistance test of 400 hours).

Examination led to the discovery that a cause of discoloration (yellowing) is that the gas (moisture, oxygen or sulfur dioxide) in the atmosphere described above makes contact with Ag atoms, and that the discoloration results from the fact that "Ag atoms constructing a silver vapor deposition film vibrate (move) and cohere by heat energy."

As shown in FIG. 10, the Ag atoms (crystal grains of Ag) that form the silver vapor deposition film on the surface of the base material cohere in places from the original orderly state, and fine unevenness is formed on the surface of the silver vapor deposition film. In a region in which this fine unevenness is formed, light of a short wavelength band (e.g., blue) is absorbed, and light of a long wavelength band (e.g., yellow to red) is reflected, so that the whole silver vapor deposition film appears yellow.

On the other hand, in JP-A-2000-106017, a problem arises because a protective film forming each of the coat layers peels off the interface with the silver vapor deposition film or a crack occurs on a surface of the protective film when using the protective film under high temperature and high humidity (in an environment of, for example, 50° C. and 95%) or keeping the protective film for a long time without being used under high temperature and high humidity.

Examination by the inventor found that a resin component of the modified silicon resin forming the protective film in accordance with JP-A-2000-106017 is composed only of a silicon resin. The protective film with good heat resistance and gas barrier properties is formed, but when used in an environment of high temperature and high humidity, problems result from an increase in internal stress of the protective film by hardening of a siloxane bond (unreacted portion at the time of baking) of the resin component. Hence, it was discovered that the resin component is changed from the silicon resin to other resins and certain flexibility is given to the protective film. Thus, internal stress occurring in the protective film is decreased, and occurrence of a crack or peeling of the protective film is prevented.

However, when a crosslink density of resin forming the protective film is low, while maintaining flexibility, it was found that in addition to the problem of gas barrier properties, Ag atoms (which receive heat energy and cohere to form fine unevenness on a surface of a silver vapor deposition film) pass through the inside of a topcoat layer and cohere so as to protrude from a surface of the topcoat layer and form fine unevenness (hereinafter called a "migration phenomenon"). Therefore, it was discovered that the Ag atoms make contact with sulfur dioxide, for example, on the surface of the topcoat layer so that silver sulfide, for example, is generated. The result is a phenomenon in which the whole silver vapor deposition film appears yellow as a result of a reflection state of light in a cohesion region of the surface of the topcoat layer.

Repeats of experiment and consideration by the inventor revealed that when a silver vapor deposition film is formed of a silver alloy including Nd rather than pure silver, cohesion is significantly inhibited when the silver vapor deposition film and Ag atoms receive heat energy. Therefore, fine unevenness is not formed on the surface of the silver vapor deposition film.

on the other hand, it was discovered that when a transparent modified silicone series resin (having a silicone resin and an acrylic resin as resin components) is used in a protective film of a topcoat layer covering a silver vapor deposition film, sufficient flexibility, migration resistance and gas barrier properties are ensured. Thus, there is no peeling of the protective film from the interface with the silver vapor deposition film, no occurrence of fine unevenness due to cohesion of Ag atoms on a surface of the topcoat layer, and no occurrence of silver sulfide as a result of contact between the silver vapor deposition film and sulfur dioxide. Therefore, the silver vapor deposition film is not discolored (e.g., yellowed), so that there is no decrease in the regular reflectance as a result of discoloration (yellowing) of the silver vapor deposition film.

BRIEF DESCRIPTION OF THE DRAWINGS

FIG. 4(a) is a diagram explaining action in which an Nd atom in a silver vapor deposition film inhibits cohesion of Ag atoms (crystal grains of Ag), and FIG. 4(b) is a diagram explaining action in which acrylic molecules in a topcoat layer inhibit cohesion of Ag atoms (crystal grains of Ag).

FIG. 5(a) is a diagram explaining a situation of heat motion of the case where a general topcoat layer made of resin receives heat energy, and FIG. 5(b) is a diagram explaining a situation of receiving heat energy and a network structure of a modified silicone series topcoat layer using a silicone series resin and an acrylic resin as resin components.

FIG. 6 is an explanatory diagram of a transition state at the time when a migration phenomenon occurs in a topcoat layer.

FIG. 10 is an explanatory diagram explaining action in which Ag atoms constructing a silver vapor deposition film formed on a surface of a base material receive heat energy and vibrate and cohere.

SUMMARY

Figure 1:
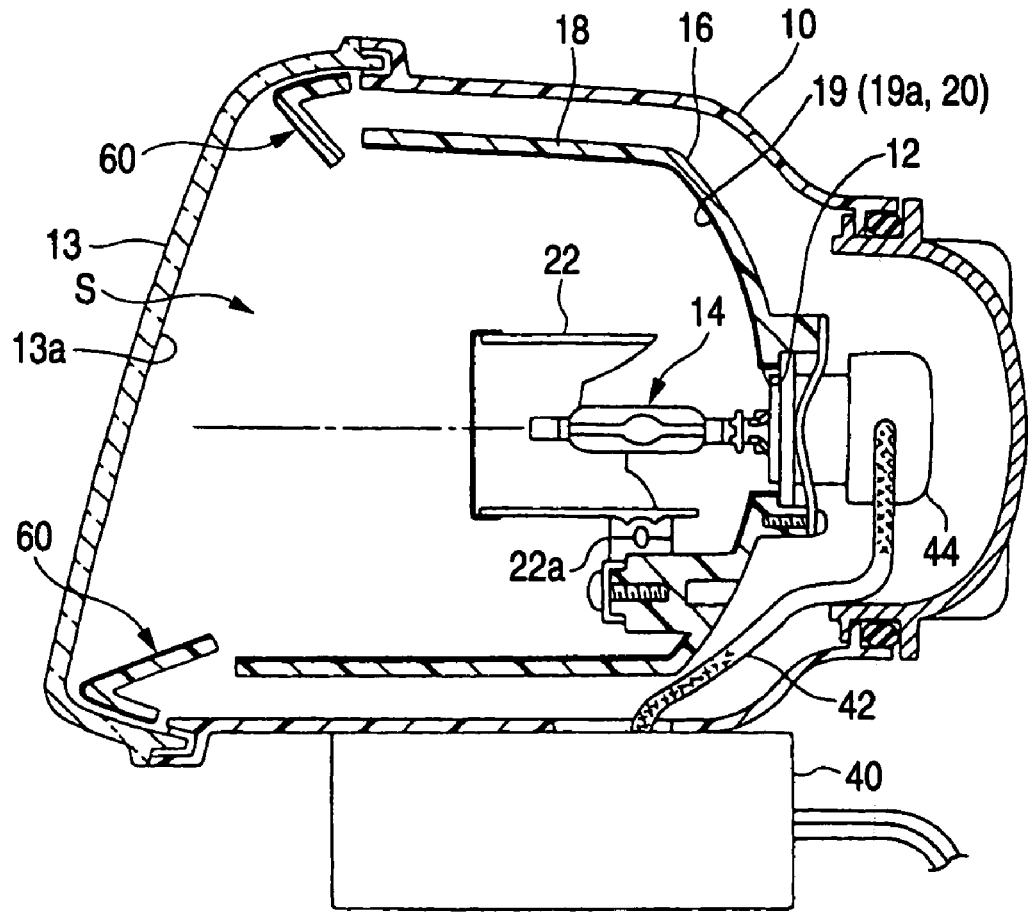
FIG. 1 is a longitudinal sectional view of a head lamp for an automobile according to a first embodiment of the invention.

The invention has been discovered based on knowledge of the inventor and problems in the conventional art. The disclosure relates to a vehicle lamp including a reflective member having a silver vapor deposition reflective surface with good durability to prevent cracking or peeling of a protective film and capable of maintaining a high reflectance for a long time, which cannot be obtained in an aluminum vapor deposition reflective surface.

Various implementations include one or more the following features. For example, the vehicle lamp can include a reflective member in which a topcoat layer which serves as a protective film is formed on a silver vapor deposition film on a surface of a base material made of synthetic resin inside a lamp chamber. The silver vapor deposition film can be formed of a silver alloy including Nd, and the topcoat layer can be formed of a transparent modified silicone series resin using a silicone resin and an acrylic resin as resin components.

A regular reflectance of a reflective surface (hereinafter called a "silver vapor deposition reflective surface") made of a silver vapor deposition film (a silver vapor deposition film formed on a surface of a base material made of synthetic resin by sputtering) formed of a silver alloy including Nd and covered with a topcoat layer (a transparent modified silicone series resin using a silicone resin and an acrylic resin as resin components, hereinafter called the "transparent modified silicone series resin") is about 95%. Also, the silver vapor deposition reflective surface with no lighting takes on a quiet pale yellowish color different from an aluminum vapor deposition reflective surface with a deep silver gray color.

That is, when a silver vapor deposition film formed on a surface of a base material is exposed to high temperature, as shown in FIG. 10, Ag atoms (crystal grains of Ag) forming the silver vapor deposition film receive heat energy and vibrate mutually. The Ag atoms (crystal grains of Ag) tend to cohere in places, but as shown in FIG. 4(b), at the interface between a topcoat layer (transparent modified silicone series resin) and the silver vapor deposition film, a part of the modified silicone molecules forming the transparent modified silicone series resin penetrates in a gap between the Ag atoms (crystal grains of Ag) and is adherently integrated tightly, so that vibration of the Ag atoms receiving the heat energy is inhibited. Thereby, cohesion of the Ag atoms is inhibited and fine unevenness is not formed on the surface of the silver vapor deposition film.

Thus, even when the Ag atoms forming the silver vapor deposition film receive heat energy, the Ag atoms remain substantially equally dispersed without cohesion (a crystal lattice of the Ag atoms is held in the original orderly state), so that the silver vapor deposition film does not appear in a yellow color and there is no decrease in a regular reflectance due to yellowing.

Also, a transparent modified silicone series resin (using a silicone resin and an acrylic resin as resin components) formed on a silver vapor deposition film comprises a three-dimensional network crosslink structure and has a high crosslink density. A protective film of a topcoat by this resin has moderate flexibility by including the acrylic resin, so that internal stress occurring in the protective film is decreased. Also, gaps between a network are smaller than an outside diameter of the Ag atom (1.44 Å) and keep the properties resistant to spreading by heat by comprising the silicone resin, so that a migration phenomenon in which Ag atoms pass through the topcoat is inhibited.

The topcoat layer (transparent modified silicone series resin) formed on a silver vapor deposition film acts as a gas barrier to gas (moisture, oxygen or sulfur dioxide) in the atmosphere under high temperature, and contact between the gas (moisture, oxygen or sulfur dioxide) in the atmosphere and the silver vapor deposition film is inhibited. Likewise, corrosion or discoloration (yellowing) resulting from reaction between the silver vapor deposition film and sulfur is blocked.

Figure 3:
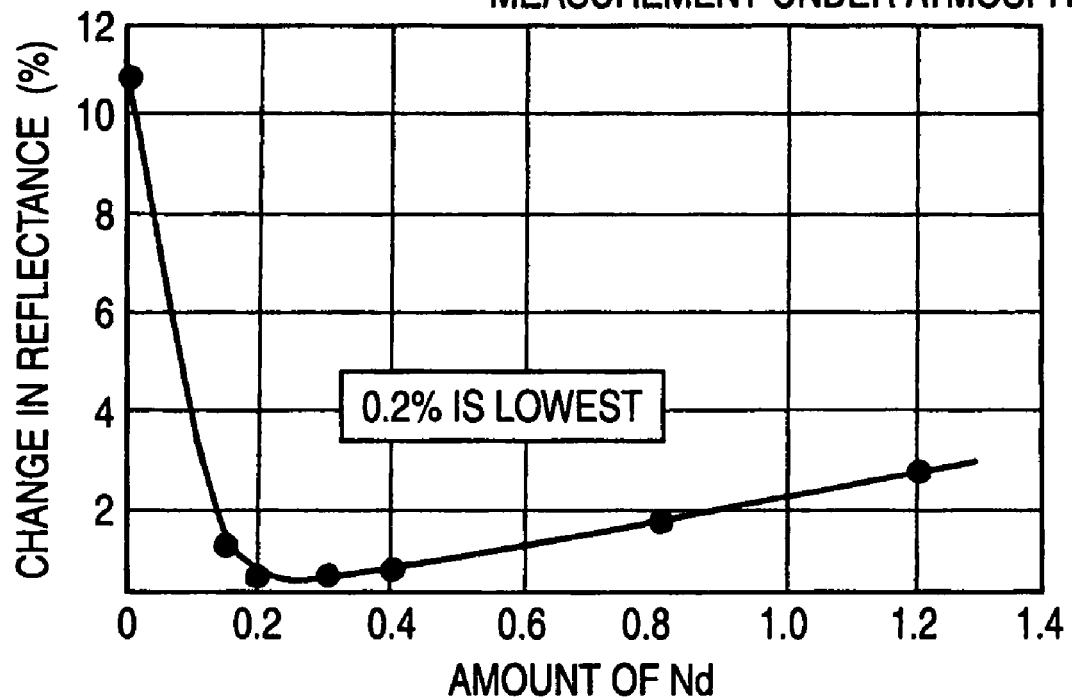
FIG. 3 is a diagram showing a correlation between a reflectance of a silver alloy vapor deposition reflective surface and an additive amount of Nd in an alloy of Ag and Nd.

On the other hand, as shown in FIG. 3, forming a silver vapor deposition film of a silver alloy including Nd is effective in inhibiting a decrease in the regular reflectance of the silver vapor deposition film as result of thermal stress and particularly, by including 0.13 atomic percent or more Nd, a decrease in the regular reflectance of about 95% can be maintained within 2%. Also, when the content of Nd exceeds 0.8 atomic percent, the decrease in the reflectance of the silver vapor deposition film exceeds 2%, and the silver vapor deposition film itself takes on a yellowish color, so that it is desirable that the content of Nd be in the range of 0.13 to 0.8 atomic percent (most desirably, the range of 0.2 to 0.4 atomic percent). In addition, the fact that the content of Nd is 0.2 atomic percent means a ratio (percentage) of the number of Nd atoms to the total number of metal atoms constructing the silver vapor deposition film.

Also, action in which a silver alloy including Nd inhibits a decrease in the regular reflectance of a silver vapor deposition film can be described as follows.

When a silver vapor deposition film formed on a surface of a base material is exposed to high temperature, as shown in FIG. 10, Ag atoms (crystal grains of Ag) forming the silver vapor deposition film receive heat energy and vibrate mutually, and the Ag atoms (crystal grains of Ag) tend to cohere in places. As shown in FIG. 4(a), however, Nd atoms are dispersed in a crystal lattice of the Ag atoms (crystal grains of Ag) and thereby such a large vacancy that the Ag atoms (crystal grains of Ag) can move by vibration is not formed in the crystal lattice of the Ag atoms (crystal grains of Ag). Therefore, the Ag atoms (crystal grains of Ag) are resistant to cohesion.

In other words, when large Nd atoms (1.82 Å) are present in the crystal lattice of the Ag atoms (1.44 Å), as shown in FIG. 4(a), the crystal lattice of the Ag atoms (1.44 Å) is distorted and small vacancies are formed in places. The vacancies, however, are trapped in an internal stress field of the Nd atoms (periphery of the Nd atoms), so that such a large vacancy that position replacement with the Ag atoms can be performed is not formed in the crystal lattice of the Ag atoms (crystal grains of Ag). As a result, the Ag atoms (crystal grains of Ag) receiving the heat energy cannot vibrate (move) sufficiently, cohesion of the Ag atoms is inhibited, fine unevenness is not formed on a surface of the silver vapor deposition film, and there is no decrease in the regular reflectance due to yellowing.

Further, as described above, at the interface between the topcoat layer (transparent modified silicone series resin) and the silver vapor deposition film, some of the acrylic molecules forming an acrylic series resin penetrate in a gap between the Ag atoms (crystal grains of Ag) and are adherently integrated tightly, so that cohesion of the Ag atoms is inhibited even more and there is no decrease in the regular reflectance due to yellowing.

In a further aspect, the content ratio between resin components of the modified silicone series resin is set so that a silicone resin is 50 to 70% by weight and an acrylic resin is 30 to 50% by weight.

As long as the content ratio between a silicone resin and an acrylic resin in resin components is within the range described above, a migration phenomenon and internal stress occurring in a topcoat layer are inhibited even more.

When an acrylic resin in which the total weight (silicone resin+acrylic resin=100% by weight) of resin components falls below 30% by weight in a content ratio between the silicone resin and the acrylic resin in the resin components, internal stress of a transparent modified silicone series resin tends to increase and flexibility decreases. On the other hand, it was discovered that when the acrylic resin exceeds 50% by weight, the crosslink density of the transparent modified silicone series resin decreases and the reflectance decreases as a result of a migration phenomenon of Ag atoms.

In some implementations, an extension reflector is used as the reflective member.

Both the reflector for the head lamp and the extension reflector have a reflective member arranged inside a lamp chamber. The reflector for the head lamp is exposed to direct light of a bulb which serves as a light source and requires sufficient heat resistance (180° C.). In the extension reflector, which is arranged so as to surround the reflector and does not reach such high temperature, a heat resistance (160° C.) lower than the heat resistance required in the reflector for the head lamp suffices, so that discoloration or corrosion is blocked in a silver vapor deposition film forming the reflective surface in the extension reflector.

Therefore, for example, in a head lamp, an extension reflector for hiding a gap between a reflector and a front opening of a lamp body is disposed in the periphery of the reflector to which a light source is attached. The reflectors act to improve the appearance by showing the entire inside of the lamp body (lamp chamber) in a mirror color, and the entire silver vapor deposition reflective surface of the extension reflector surrounding an aluminum vapor deposition film reflective surface of the reflector appears in a quiet, pale, yellowish silver tone color.

In some implementations, a reflector for an automobile head lamp using an LED as a light source is used as the reflective member.

Unlike heat resistance (180° C.) required in a reflector for a head lamp exposed to direct light of a bulb which serves as a light source, heat resistance of about 120° C. suffices in a reflector used in an automobile head lamp using an LED as a light source, so that discoloration or corrosion is blocked in a silver vapor deposition film forming the reflective surface of the reflector used in the head lamp using the LED as the light source.

As is evident from the foregoing description, a lamp for a vehicle in which a silver vapor deposition reflective surface of a reflective member has no corrosion and discoloration (yellowing) and a high regular reflectance can be maintained for a long time. Also, when there is no lighting, the reflective member appears in a warm mirror color with a slightly yellow tinge. Further, a topcoat layer is resistant to peeling from a silver vapor deposition film and becomes resistant to cracking. Durability with respect to long-term use can be maintained.

In some cases, both reflective surfaces of an extension reflector and a reflector for a head lamp using an LED as a light source have no corrosion and discoloration (yellowing). A high regular reflectance is maintained for a long time, so that the reflectors of the vehicle lamp have a warm mirror color with a slightly yellow tinge which is maintained for a long time.

An extension reflector often is arranged so as to protrude from the front side of a lamp chamber and is arranged in a position easier to identify visually than a reflector, so that forming a silver vapor deposition reflective surface in this extension reflector is effective in a visual effect.

In the case of applying the invention to a head lamp, the entire periphery of an aluminum vapor deposition reflective surface of the reflector appears in a quiet, pale, silver tone color of a silver vapor deposition surface of an extension reflector. The head lamp can be differentiated from a conventional head lamp having a glaring image in which the entire inside of the lamp chamber glares in a silver gray color by aluminum vapor deposition reflective surfaces of an extension reflector and a reflector.

Other features and advantages will be readily apparent from the following detailed description, the accompanying drawings and the claims.

BEST MODE FOR CARRYING OUT THE INVENTION

Next, various implementations of the invention will be described below.

In FIG. 1, numeral 10 is a lamp body with synthetic resin container shape. A lamp chamber S is defined by assembling a front lens 13 into a front opening of the lamp body 10. A paraboloidal reflector 16 made of synthetic resin into is disposed inside the lamp chamber S. A discharge bulb 14 which serves as a light source is inserted into the reflector. Numeral 12 is a bulb insertion hole formed in the back vertex of the reflector 16, and the discharge bulb 14 is inserted therein.

A shade 22 for forming a clear cut line of a low beam while preventing occurrence of glare is arranged in the front of the bulb 14. Numeral 22a is a leg of the shade 22 screwed into the reflector 16. Light emission of the bulb 14 is reflected by an effective reflective surface of the reflector 16, and the light is distributed in a predetermined forward direction by a light distribution control step 13a formed in the back of the front lens 13 and a light distribution pattern of a low beam is formed.

Numeral 40 is a weighty starter and ballast circuit unit for integrally receiving a starter circuit for applying a high voltage to (an arc tube of) the discharge bulb 14 and for starting a discharge between electrodes of the arc tube and for receiving a ballast circuit for continuously performing a stable discharge between the electrodes of the arc tube. and the unit is fixed to the outside of a lower wall of the lamp body 10, and an output cable 42 extending from a lighting circuit of the unit 40 is connected to the discharge bulb 14 through a connector 44.

The reflector 16 into which the bulb 14 is integrally inserted is tiltably supported around the tilt axis connecting a fixed tilt fulcrum to backward and forward movement fulcrums by an aiming mechanism (not shown) constructed of a pair of backward and forward movement fulcrums and one fixed fulcrum of a ball joint structure. An extension reflector 60 which extends in frame shape along the front edge of the reflector 16 and hides a gap between the reflector 16 and the lamp body 10 is disposed in the front edge of a front opening of the lamp body 10 in the inside of the lamp chamber S.

The reflector 16 has a structure in which a reflective surface 19a with a regular reflectance of 90% made of an aluminum vapor deposition film 19 is disposed on a surface of a reflector base material 18 made of FRP and a topcoat layer 20 which is a protective film made of a transparent modified silicone series resin is formed thereon.

Figure 2:
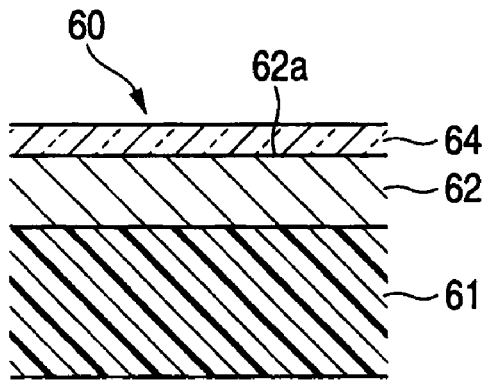
FIG. 2 is an enlarged sectional diagram of a reflective surface of an extension reflector disposed in the same head lamp.

On the other hand, the extension reflector 60 has a structure in which a reflective surface 62a made of a silver vapor deposition film 62 with a regular reflectance of about 95% is disposed on a surface of a reflector base material 61 made of PBT/PET and also a topcoat layer 64 of a transparent modified silicone resin series is formed thereon as shown in FIG. 2.

Therefore, in the present embodiment, by a hue peculiar to the silver vapor deposition reflective surface 62a of the extension reflector 60 surrounding the aluminum vapor deposition reflective surface 19a of the reflector 16, the periphery of the inside and outside of the lamp chamber S at the time of no lighting appears in a quiet, pale, silver tone color (silver color with a slightly yellow tinge) which cannot be obtained in the conventional head lamp.

Inside the lamp chamber S at the time of no lighting, the whole periphery of the aluminum vapor deposition reflective surface 19a of the reflector 16 appears in a quiet, pale, silver tone color by the silver vapor deposition reflective surface 62a of the extension reflector 60, and a fresh image obviously different from the conventional head lamp with a glaring image in which the whole inside of a lamp chamber glares in a silver gray color by each of the aluminum vapor deposition reflective surfaces of a reflector and an extension reflector surrounding this reflector can be obtained.

Next, a structure of the silver vapor deposition reflective surface 62a of the extension reflector 60 is described in detail.

As described above, the silver vapor deposition reflective surface 62a has a structure in which the silver vapor deposition film 62 and the topcoat layer 64 are integrally laminated on the surface of the reflector base material 61 made of PBT/PET, and it is constructed so that by adopting the following configuration, corrosion and discoloration (yellowing) of the silver vapor deposition reflective surface 62a are prevented and the original high regular reflectance at the time of formation is held for a long time in the silver vapor deposition reflective surface 62a.

First, the topcoat layer 64 which is a protective film on the silver vapor deposition film 62 formed on the surface of the reflector base material 61 made of PBT/PET is constructed of a modified silicone series resin. "Cohesion of Ag atoms at the time of heat energy action," which is considered to be one of factors in yellowing of the silver vapor deposition reflective surface 62a, is inhibited.

That is, when the silver vapor deposition film 62 formed on the surface of the base material 61 is exposed to high temperature, as shown in FIG. 10, Ag atoms (crystal grains of Ag) forming the silver vapor deposition film receive heat energy and vibrate mutually and the Ag atoms (crystal grains of Ag) tend to cohere in places, but as shown in FIG. 4(b), at the interface between the topcoat layer (transparent modified silicone series resin) 64 and the silver vapor deposition film 62, a part of the silicone molecules constructing the transparent modified silicone series resin penetrates in a gap between the Ag atoms (crystal grains of Ag) and is adherently integrated tightly, so that vibration of the Ag atoms receiving the heat energy is inhibited, cohesion of the Ag atoms is inhibited, and fine unevenness is not formed on the surface of the silver vapor deposition film 62.

Even when the Ag atoms forming the silver vapor deposition film 62 receive the heat energy, the Ag atoms are maintained substantially equally dispersed without cohesion (a crystal lattice of the Ag atoms is held in the original orderly state), so that the silver vapor deposition film 62 does not appear in a yellow color and there is no decrease in the regular reflectance due to yellowing.

Second, the silver vapor deposition film 62 is formed on the surface of the reflector base material 61 made of PBT/PET by sputtering vapor deposition of a silver alloy in which Nd is added to Ag by a predetermined amount, and is formed, for example, of a silver alloy of Ag (98 atomic percent). "Cohesion of Ag atoms at the time of heat energy action" is inhibited.

FIG. 3 is a diagram showing a correlation between a change in reflectance of a silver alloy vapor deposition reflective surface and an additive amount of Nd in an alloy of Ag and Nd. As is evident from this diagram, in pure silver to which Nd is not added, a decrease in the reflectance after environmental testing with respect to a reflectance in an initial state exceeds 10% and is significant. Nd is effective in inhibiting a decrease in the regular reflectance of the silver vapor deposition film because a relative reflectance decreases when the additive amount of Nd increases. Particularly in the case of including 0.13 atomic percent or more Nd, a change in reflectance is within 2% and the regular reflectance of about 95% can be maintained. The inhibition action of "cohesion of Ag atoms at the time of heat energy action" of this Nd can be described as follows.

When a silver vapor deposition film formed on a surface of a base material is exposed to high temperature, as shown in FIG. 10, Ag atoms (crystal grains of Ag) forming the silver vapor deposition film receive heat energy and vibrate mutually and the Ag atoms (crystal grains of Ag) tend to cohere in places, but as shown in FIG. 4(a), Nd atoms are dispersive in a crystal lattice of the Ag atoms (crystal grains of Ag). A large vacancy such that the Ag atoms (crystal grains of Ag) can move by vibration is not formed in the crystal lattice of the Ag atoms (crystal grains of Ag) and, therefore, the Ag atoms (crystal grains of Ag) are resistant to cohesion.

When large Nd atoms (1.82 Å) are present in the crystal lattice of the Ag atoms (1.44 Å), as shown in FIG. 4(a), the crystal lattice of the Ag atoms (1.44 Å) is distorted and small vacancies are formed in places, but the vacancies are trapped in an internal stress field of the Nd atoms (periphery of the Nd atoms), so that a large vacancy that would allow position replacement with the Ag atoms is not formed in the crystal lattice of the Ag atoms (crystal grains of Ag). As a result, the Ag atoms (crystal grains of Ag) receiving the heat energy cannot vibrate (move) sufficiently, cohesion of the Ag atoms is inhibited, fine unevenness is not formed on the surface of the silver vapor deposition film, and there is no decrease in the regular reflectance due to yellowing.

Also, as a too large additive amount of Nd leads to a decrease in thermal conductivity or the regular reflectance of a silver vapor deposition reflective surface, it is desirable that the additive amount of Nd be 0.13 to 0.8 atomic percent (desirably, 0.2 to 0.4 atomic percent).

Third, the topcoat layer (transparent modified silicone series resin using a silicone resin and an acrylic resin as resin components) 64 which is a protective film formed on the silver vapor deposition film 62 comprises a three-dimensional network crosslink structure with a high crosslink density as shown in FIG. 5(b).

Examination by an inventor revealed that when an acrylic resin in the total weight (silicone resin+acrylic resin=100% by weight) of resin components falls below 30% by weight in a content ratio between the silicone resin and the acrylic resin in the resin components, internal stress of the transparent modified silicone series resin tends to increase and flexibility decreases. When the acrylic resin exceeds 50% by weight, a crosslink density of the transparent modified silicone series resin decreases and a reflectance decreases as a result of a migration phenomenon of Ag atoms. Therefore, the topcoat layer (transparent modified silicone series resin) 64 is constructed by a polysiloxane bond, and a compounding ratio of the resin components to the total weight is adjusted so that the acrylic resin becomes 50 to 30% by weight when the silicone resin is set at 50 to 70% by weight.

In this case, the topcoat layer (transparent modified silicone series resin) 64 has moderate flexibility by including the acrylic resin and becomes resistant to cracking or peeling from a silver vapor deposition film by a decrease in internal stress occurring in a protective film. High durability is maintained. Also, gaps between a network are small and include the silicone resin and thus are resistant to spreading by heat as compared with a general topcoat made of resin as shown in FIG. 5(a), so that a migration phenomenon of Ag atoms as shown in FIG. 6 is inhibited. Corrosion on the surface of the topcoat layer (transparent modified silicone series resin) 64 and a decrease in a reflectance as a result of occurrence of minute unevenness due to cohesion are inhibited.

In addition, the topcoat layer 64 can be formed by providing the silver vapor deposition film 62 on the surface of the reflector base material 61 made of PBT/PET by sputtering vapor deposition and applying a transparent modified silicone series resin paint compounded in the ratio (a silicone resin is 50 to 70% by weight and an acrylic resin is 50 to 30% by weight) using the silicone resin and the acrylic resin as resin components to the silver vapor deposition film 62, or by performing plasma polymerization by a CVD method in a state of gasifying the same resin.

Fourth, the topcoat layer (transparent modified silicone series resin) 64 which is the protective film formed on the silver vapor deposition film 62 acts as a gas barrier to gas (moisture, oxygen or sulfur dioxide) in the atmosphere under high temperature. Contact between the gas (moisture, oxygen or sulfur dioxide) in the atmosphere and the silver vapor deposition reflective surface 62a is inhibited, and corrosion or discoloration (yellowing) of the silver vapor deposition reflective surface 62a is prevented.

Figure 7:
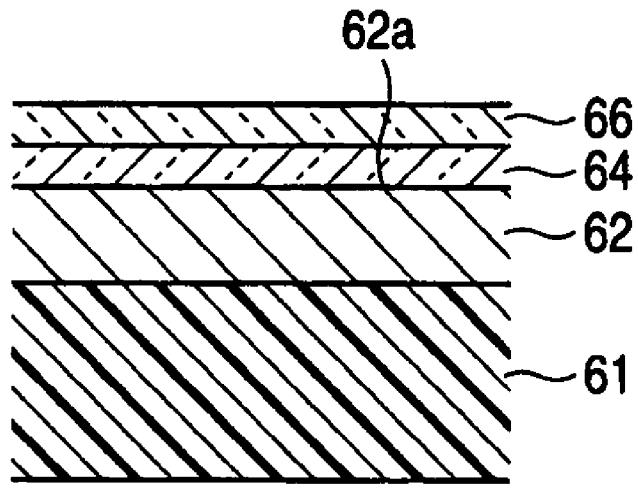
FIG. 7(a) is an enlarged sectional diagram of a reflective surface of an extension reflector which is a main part of a head lamp for automobile according to a second embodiment of the invention.
FIG. 7(b) is an enlarged sectional diagram of a reflective surface of an extension reflector which is a main part of a head lamp for an automobile according to a third embodiment of the invention.
Figure 7:
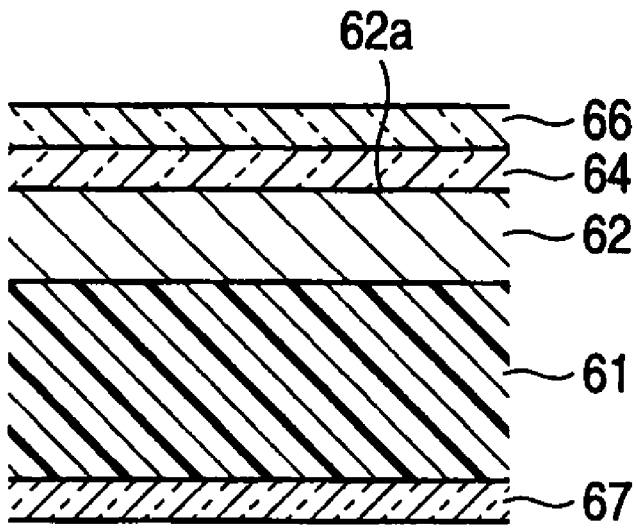

FIGS. 7(a) and 7(b) are enlarged sectional diagrams of extension reflectors which illustrate second and third embodiments of the invention, respectively.

In the first embodiment, the silver vapor deposition film 62 is formed on a surface of the reflector base material 61 made of PBT/PET by sputtering vapor deposition. The transparent modified silicone series resin layer 64 using a silicone resin and an acrylic resin as resin components is formed on the silver vapor deposition film 62 as a topcoat layer. In the second embodiment shown in FIG. 7(a), a DLC layer 66—having good adhesion to a topcoat layer (transparent modified silicone series resin using a silicone resin and an acrylic resin as resin components) 64 in addition to good durability, heat resistance and gas barrier properties—is laminated and formed so as to cover the topcoat layer 64.

In the third embodiment shown in FIG. 7(b), a DLC layer 67—having good adhesion to a base material 61 made of PBT/PET in addition to good durability, heat resistance and gas barrier properties—is laminated and formed on the back side of the base material 61. A DLC layer 66 is laminated and formed so as to cover a topcoat layer 64 in a manner similar to the second embodiment.

In these embodiments, the DLC layer 66 has particularly good gas barrier properties to inhibit passage of sulfur dioxide (sweat, exhaust gas), oxygen (hot oxygen) and moisture in the atmosphere, so as to prevent a situation in which Ag atoms in the silver vapor deposition film 62 react with the oxygen (hot oxygen) or moisture in the atmosphere to generate silver oxide or react with the sulfur dioxide (sweat, exhaust gas) to generate silver sulfide. As a result of this, corrosion or discoloration of a silver vapor deposition reflective surface 62a is prevented, and the high regular reflectance of the silver vapor deposition reflective surface 62a is maintained for a longer time. Particularly, in the third embodiment, penetration of gas in the atmosphere from the back side of the base material 61 is blocked, so that the corrosion or discoloration of the silver vapor deposition reflective surface 62a is prevented, and the high, regular reflectance in the silver vapor deposition reflective surface 62a is maintained.

In the first to third embodiments, the silver vapor deposition film 62 is directly formed on the surface of the extension reflector base material 61. However, a structure in which an undercoat layer is formed on the surface of the base material 61 and the silver vapor deposition film 62 is formed on the undercoat layer may be adopted.

The extension reflector base material 61 is constructed of the PBT/PET resin, but as the extension reflector base material 61 or a reflector base material for a head lamp using an LED as a light source, resins such as ABS resin, AAS resin, PP resin or PC resin with the extent to which heat resistance of 160° C. can be cleared may be used.

Figure 8:
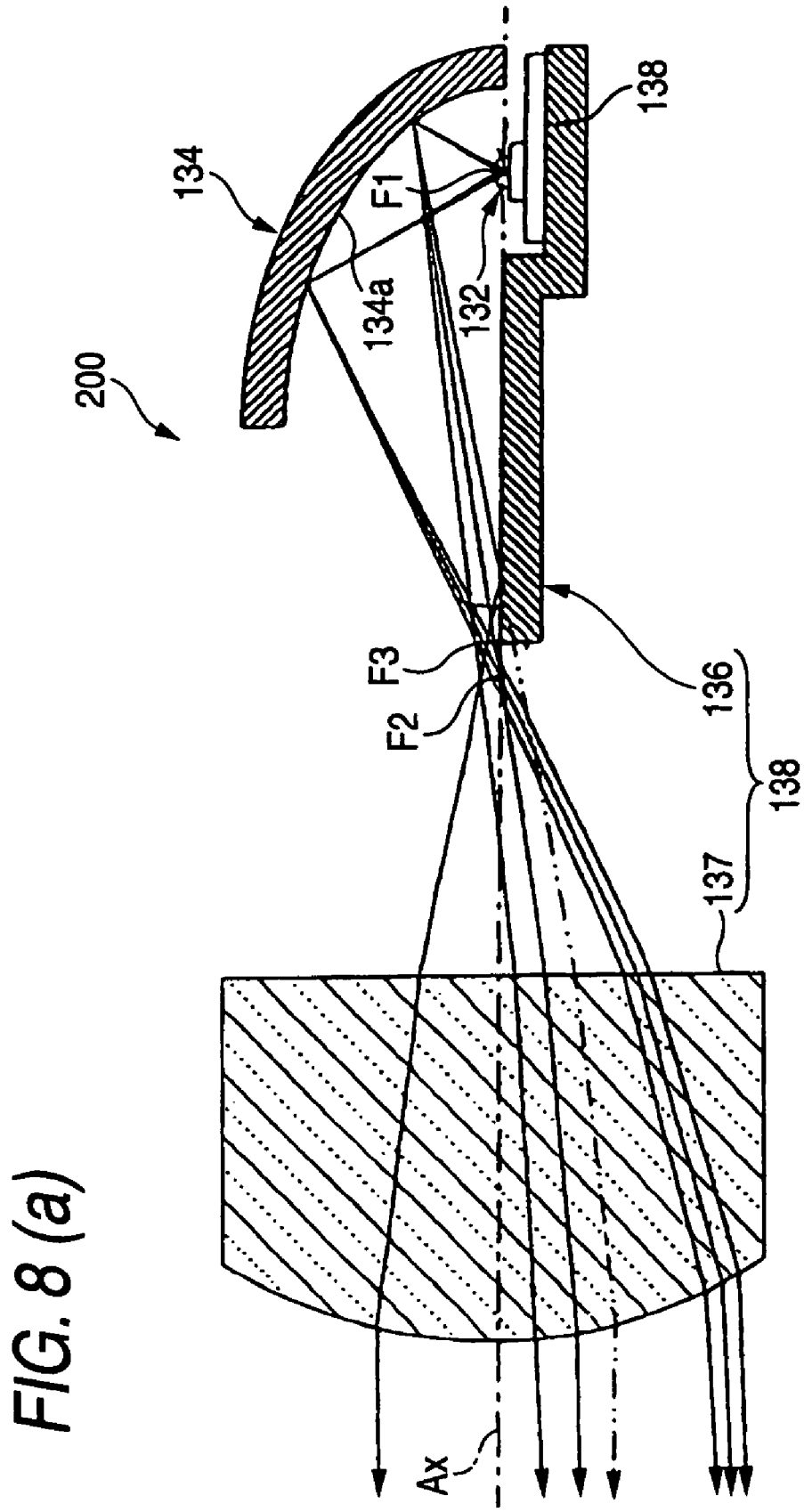
FIG. 8(a) is a sectional diagram of a reflective surface of a reflector which is a main part of a head lamp for automobile using an LED as a light source according to a fourth embodiment of the invention.
FIG. 8(b) is an enlarged sectional diagram of the reflective surface of the reflector.
Figure 8:
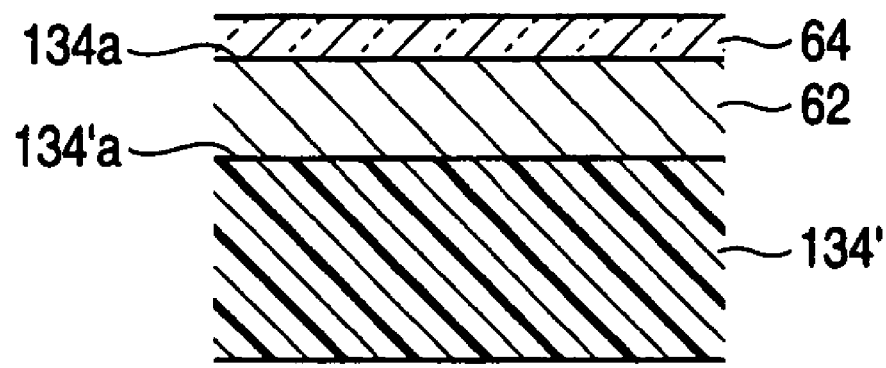
Figure 9:
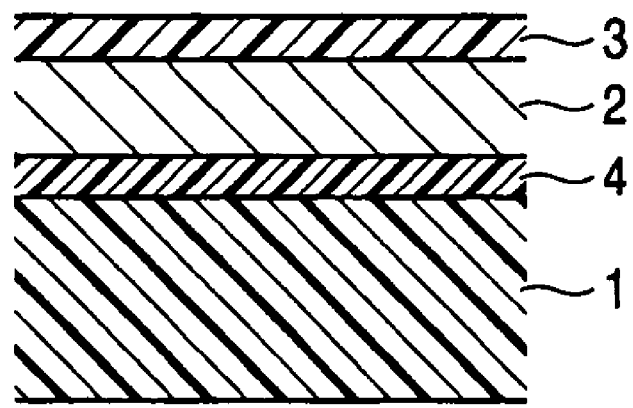
FIG. 9 is an enlarged sectional diagram of a reflective surface of a reflective member such as a conventional reflector or an extension reflector.

A fourth embodiment of the invention shown in FIG. 8 includes a reflector 134 in a head lamp 200 comprising an LED light source 132 supported on a substrate 138 and a light control member 139 made of a projection lens 137 and a shade 136 for cutoff line formation. A silver vapor deposition film 62 is formed on a surface 134'a of a reflector base material 134' and a topcoat layer 64 made of a transparent modified silicone series resin is laminated on a surface of the silver vapor deposition film 62 used as a reflective surface 134a.

In the case of a reflector in a head lamp using a recently developed LED as a light source even for a reflector of a head lamp, such heat resistance (180° C.) as to be required in the reflector in the head lamp using a discharge bulb, a halogen bulb or an incandescent bulb as a light source is not required, so that it can also be sufficiently applied to a reflector for head lamp with heat resistance of about 120° C. as in the reflector (using a PC resin material etc. as a base material) for head lamp using the LED as the light source.

In addition, when heat resistance of 160° C. required in a reflector for a head lamp suffices as a result of using a light source such as an LED with a low calorific value as a light source for head lamp, it also can be sufficiently applied to the reflector for head lamp in a manner similar to the fourth embodiment. That is, a reflector in which a resin silver vapor deposition film 62 is formed on a base material such as a PC resin having heat resistance of 160° C. and a topcoat layer 64 made of a modified silicone series resin is formed on a surface of the film 62 can be used as the reflector for head lamp.

Other implementations are within the scope of the claims.

What is claimed is:

1. A vehicle lamp comprising a reflective member having a topcoat layer as a protective film on a silver vapor deposition film on a surface of a base material made of synthetic resin inside a lamp chamber, wherein the silver vapor deposition film comprises a silver alloy including Nd, and the topcoat layer comprises a transparent modified silicone series resin including a silicone resin and an acrylic resin, wherein the silicone resin is in the range of 50 to 70% by weight and the acrylic resin is in the range of 30 to 50% by weight in a content ratio between resin components of the modified silicone series resin.

2. A vehicle lamp comprising a reflective member having a topcoat layer as a protective film on a silver vapor deposition film on a surface of a base material made of synthetic resin inside a lamp chamber, wherein the silver vapor deposition film comprises a silver alloy including Nd, and the topcoat layer comprises a transparent modified silicone series resin including a silicone resin and an acrylic resin, wherein the reflective member is a reflector for an automobile head lamp with an LED as a light source.

3. A vehicle lamp as claimed in claim 1 wherein the reflective member is an extension reflector.

4. A vehicle lamp as claimed in claim 1 wherein the reflective member is a reflector for an automobile head lamp with an LED as a light source.

* * * * *